United States Patent [19]

Harder, Jr.

[11] 4,252,372
[45] Feb. 24, 1981

[54] TRASH SHIELD FOR SEAT

[75] Inventor: Arthur J. Harder, Jr., Franklin Park, Ill.

[73] Assignee: Coach and Car Equipment Corporation, Elk Grove Village, Ill.

[21] Appl. No.: 56,420

[22] Filed: Jul. 10, 1979

[51] Int. Cl.³ .............................................. A47C 7/02
[52] U.S. Cl. ................... 297/452; 248/188.1;
297/182; 297/463
[58] Field of Search ............... 108/27; 297/158, 182,
297/183, 217, 232, 244, 445, 450, 452, 463;
5/424, 425, 426, 427, 428, 429, 430, 402, 493;
248/188.1

[56] References Cited

U.S. PATENT DOCUMENTS

| 2,084,871 | 6/1937 | Schwarzkopf | 248/188.1 |
| 2,836,229 | 5/1958 | Spetner | 297/182 |
| 3,099,488 | 7/1963 | Eckenrod | 297/463 |
| 3,871,041 | 3/1975 | Plume | 5/402 |
| 3,912,085 | 10/1975 | Cooke et al. | 108/27 X |
| 3,959,854 | 6/1976 | Lewis | 5/493 X |
| 3,981,534 | 9/1976 | Wilton | 5/402 X |
| 4,077,665 | 3/1978 | Storch | 297/457 X |

FOREIGN PATENT DOCUMENTS

| 4449 | of 1874 | United Kingdom | 5/493 |
| 13369 | of 1908 | United Kingdom | 5/493 |

Primary Examiner—James T. McCall
Attorney, Agent, or Firm—Merriam, Marshall & Bicknell

[57] ABSTRACT

A shield for covering an elongated, horizontally extending gap between the bottom of the front end of a seat cushion and a frame member therebelow. The shield includes a body portion for embracing the frame member, a hook portion extending upwardly and frontwardly over the frame member and a flap portion extending upwardly and rearwardly over the frame member to close the gap. The shield is composed of resilient material. The flap portion has an upper terminal edge engaged by the bottom of the seat cushion to resiliently deform the flap portion.

12 Claims, 5 Drawing Figures

TRASH SHIELD FOR SEAT

BACKGROUND OF THE INVENTION

The present invention relates generally to seats and more particularly to seats for a mass transit vehicle such as a bus.

In one such embodiment of mass transit seating, the seat comprises a frame which is supported by the wall or floor of the vehicle, and the rest of the seat, comprising an occupant-accommodating portion and a seat back, are mounted atop the seat frame with brackets. The seat frame typically includes a horizontally disposed, elongated bar or member located below the front end of the occupant-accommodating portion of the seat, and a horizontally elongated gap is defined between the latter and the bar.

There is a tendency on the part of some passengers on mass transit vehicles to stuff trash into this gap. This is unsightly, and the trash is not readily removable by maintenance personnel. Moreover, the gap is not aesthetically pleasing even if it is not stuffed with trash.

SUMMARY OF THE INVENTION

In accordance with the present invention, there is provided a horizontally elongated trash shield for closing the gap between the seat frame bar and the front end of the occupant-accommodating portion of the seat.

The trash shield has a body portion which embraces the front bar of the frame and a flap portion which closes the above-described gap. The body portion of the shield has a configuration which permits it to grip or securely engage the bar of the seat frame without fasteners. The shield also includes a hook portion extending from the body portion upwardly and forwardly in relation to the rear surface of the bar to hook over the top surface of the bar.

The flap portion of the shield extends from the body portion upwardly and rearwardly in relation to the front surface of the bar to close the gap between the occupant-accommodating seat portion and the bar. The flap portion comprises an upper terminal edge for engagement with the bottom surface of the occupant-accommodating portion of the seat. The flap portion (as well as the rest of the shield) is composed of resilient material which renders the flap portion resiliently deformable in response to engagement of the flap portion's upper terminal edge by the bottom of the occupant-accommodating seat portion.

When the flap portion is in its normal, undeformed, disposition it extends at a relatively steep angle in an upward, rearward direction. When the flap portion is deformed, as by its engagement with the bottom surface of the occupant-accommodating seat portion, it extends at a shallower angle than when it was in its undeformed disposition. Deformation of the flap portion from the normal, angularly extending disposition it occupies before deformation, increases the grip of the body portion of the shield on the seat frame bar which the body portion embraces.

The shield may be readily removed for maintenance or repair purposes, or to replace the shield.

Other features and advantages are inherent in the structure claimed and disclosed or will become apparent to those skilled in the art from the following detailed description in conjunction with the accompanying diagrammatic drawings.

DETAILED DESCRIPTION

Figure 1:
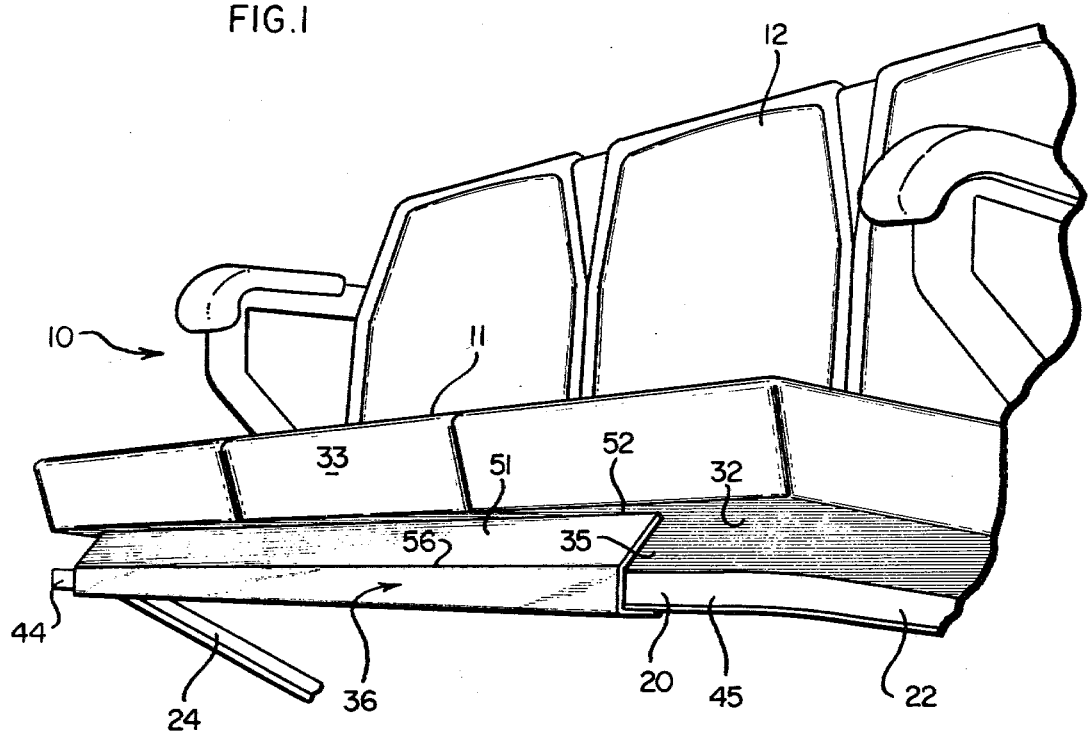
FIG. 1 is a perspective of a mass transit seat having a trash shield constructed in accordance with an embodiment of the present invention.
Figure 2:
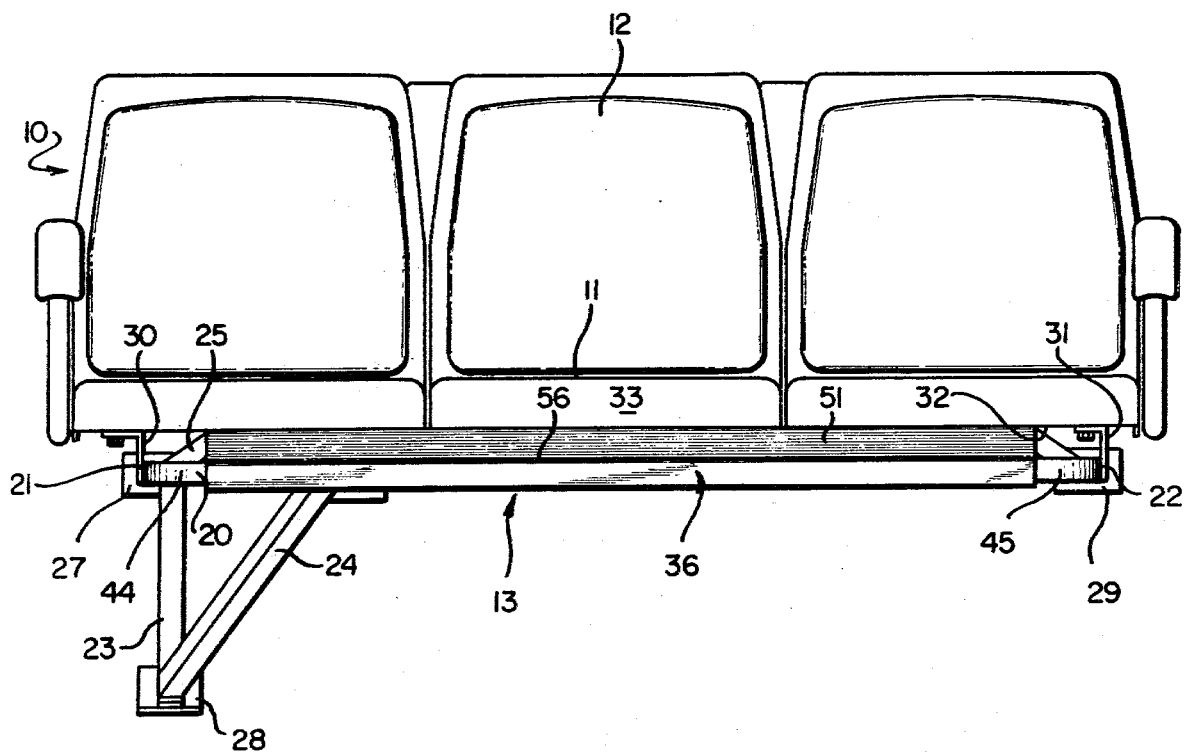
FIG. 2 is a front elevational view of the embodiment of FIG. 1.
Figure 3:
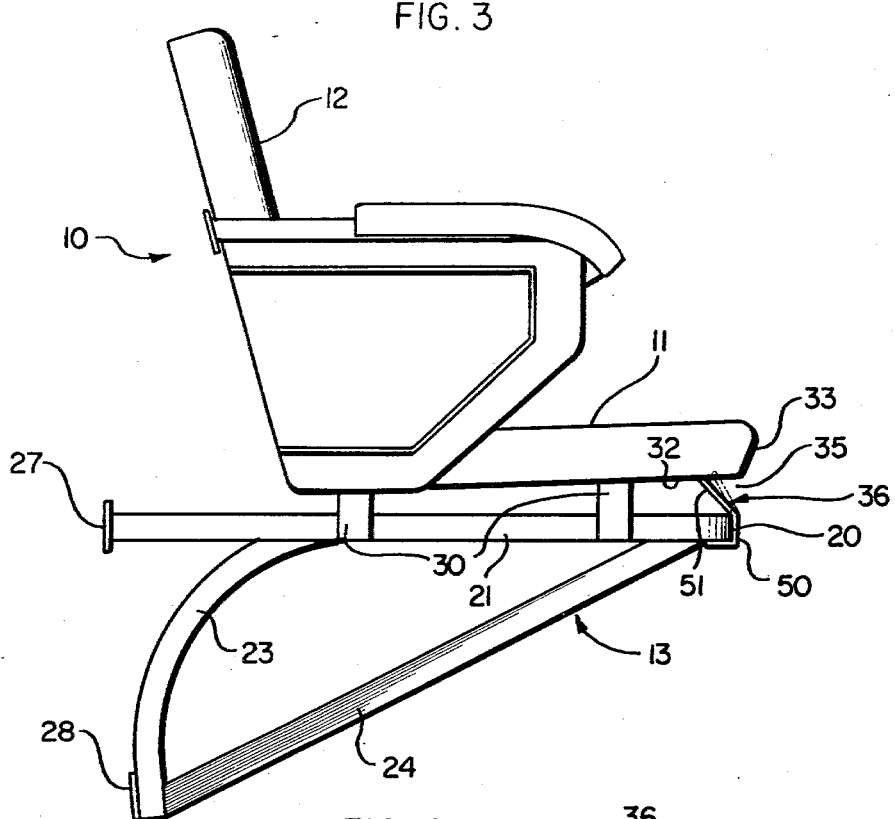
FIG. 3 is a side elevational view of the embodiment of FIG. 1.

Referring initially to FIGS. 1–3, indicated generally at 10 is the seat of a mass transit vehicle. Seat 10 comprises an occupant-accommodating portion 11, a seat back 12 and a tubular seat frame 13.

Frame 13 comprises a pair of side portions 21, 22 between which extends a horizontally disposed front portion or member 20. Frame 13 also includes a diagonal brace member 24, an arcuate support member 23 and a cross member 25 extending between side members 21, 22 (FIG. 2). Frame 13 is typically attached to the wall of the vehicle interior at 27, 28 and 29. Attached to frame side portions 21, 22 are respective brackets 30, 31 on which is mounted the bottom 32 of occupant-accommodating portion 11.

Occupant-accommodating portion 11 comprises a front end 33, and seat frame front member 20 is spaced below front end 33. A horizontally elongated gap 35 is defined between seat frame front member 20 and front end 33 of the seat's occupant-accommodating portion 11. Closing gap 35 is a trash shield 36 constructed in acccordance with an embodiment of the present invention.

Figure 4:
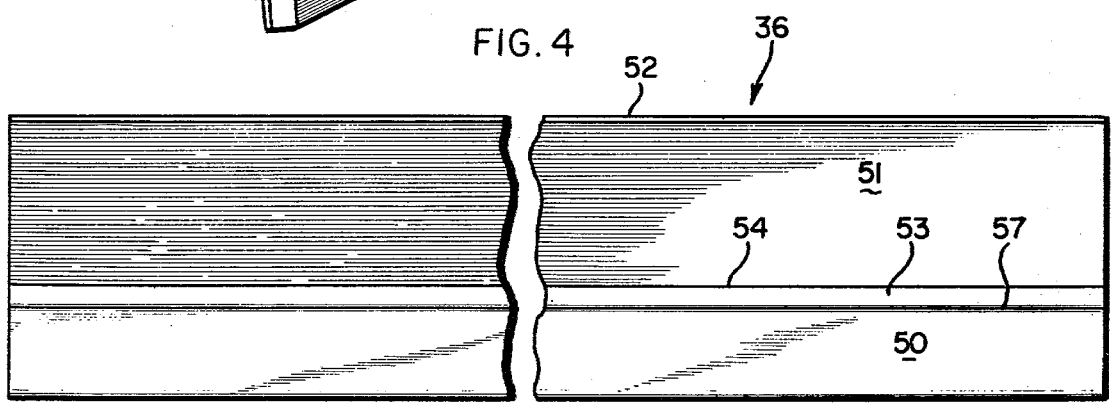
FIG. 4 is an enlarged, fragmentary rear view of the trash shield.
Figure 5:
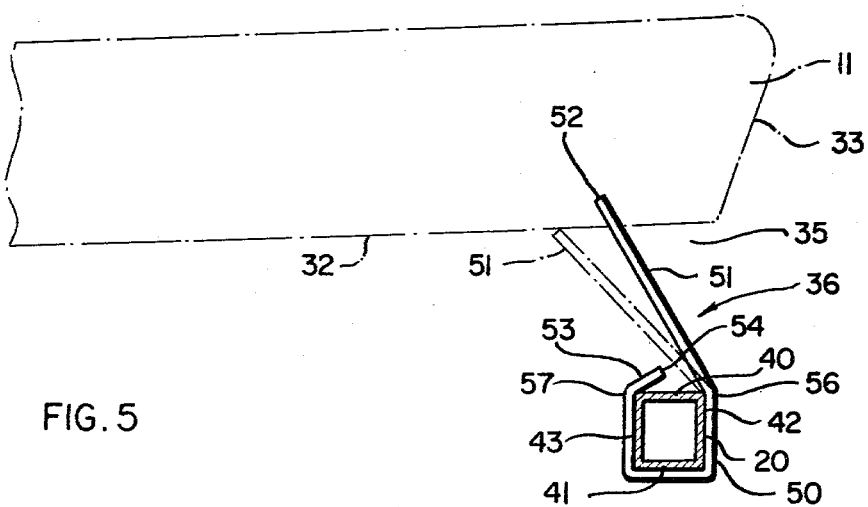
FIG. 5 is a side view of the trash shield.

Referring to FIG. 5, seat frame front member 20 comprises a top surface 40, a bottom surface 41, a front surface 42 and a rear surface 43. Referring to FIGS. 4 and 5, trash shield 36 has a U-shaped body portion including an upper front end part 56 and an upper rear end part 57. Integral with body portion 50 is a flap portion 51 extending upwardly and rearwardly from upper front part 56 of body portion 50. Also integral with body portion 50 is a hook portion 53 extending upwardly and forwardly from upper rear part 57 of the body portion.

Trash shield 36 is composed of a resilient material such as a springable ferrous or non-ferrous metal or a resilient plastic such as polyvinyl chloride or ABS (acrilonitrile butadiene, styrene).

The resilient character of plastic shield 36 permits it to be readily engaged manually around seat frame front member 20 in the manner illustrated in FIG. 5. In practice, the plastic shield is snapped into place on front member 20 to engage the latter before the occupant-accommodating portion 11 of seat 10 is assembled atop brackets 30, 31. When the shield is thus engaged to member 20, body portion 50 of the shield embraces the bottom, front and rear surfaces 41, 42 and 43, respectively, of seat frame front member 20 (FIG. 5). In addition, hook portion 53 extends from body portion 50 upwardly and forwardly in relation to rear surface 43 of member 20, and hook portion 53 hooks over top surface 40 of member 20 to help shield 36 grip member 20. Also, flap portion 51 of the shield extends from body portion 50 upwardly and rearwardly in relation to front surface 42 of seat frame front member 20. As shown in FIG. 5, flap portion 51 closes gap 35 between the bottom 32 of occupant-accommodating seat portion 11 and front frame member 20.

Flap portion 51 has an upper terminal edge 52, and hook portion 53 has an upper terminal edge 54. When the occupant-accommodating portion 11 of seat 10 is assembled atop brackets 30, 31 (FIGS. 2–3), the bottom 32 of occupant-accommodating portion 11 engages terminal edge 52 on flap portion 51. Flap portion 51 is resiliently deformed in response to this engagement which bends the flap portion from an undeformed disposition in which the flap portion extends upwardly and rearwardly in a relatively steep angle (full lines in FIG. 5) to a deformed disposition in which the flap portion extends at a shallower angle than when it was in its undeformed disposition (dashdot lines in FIG. 5). When flap portion 51 is bent from its undeformed disposition to its deformed disposition, this has the affect of increasing the gripping action of the trash shield's body portion 50 and hook portion 53 on front member 20.

For replacement or maintenance purposes, trash shield 36 can be removed from seat frame front member 20 by forcibly pulling hook portion 53 off front member 20 at one end 44 of member 20 and then peeling the trash shield off front member 20 from end 44 to the other end 45 of the front member.

Trash shield 36 could not be normally readily removed by a vandal sitting in the seat because it would be difficult for a vandal sitting in the seat to reach with his fingers below and behind the front member 20 to grip hook portion 53 in such a manner as to peel it off. The normal tendency on the part of a vandal sitting in the seat would be to push the flap portion rearwardly, and this would only increase the gripping action of body portion 50 and hook portion 53 on front member 20 of the seat frame.

In the engaged disposition shown in FIG. 5, hook portion 53 is sprung or resiliently deformed upwardly and rearwardly slightly in relation to the normal disposition it would occupy when unengaged from front member 20. This creates a tendency on the part of hook portion 53 to "close-up" with respect to body portion 50, and this increases the gripping action of hook portion 53 and body portion 50 on front member 20.

The trash shield may be manufactured from a sheet of resilient material which can be bent to the configuration illustrated in the drawing. In the case of a sheet of thermoplastic resilient material, the sheet would be heat-bent to the desired configuration.

The foregoing detailed description has been given for clearness of understanding only, and no unnecessary limitation should be understood therefrom, as modifications will be obvious to those skilled in the art.

I claim:

1. In a seat including an occupant-accommodating portion having a bottom surface and a seat frame including a horizontally disposed member having top and bottom surfaces and front and rear surfaces, said member being located below the front end of said occupant-accommodating portion to define a horizontally elongated gap between the latter and said member, the improvement comprising a horizontally elongated trash shield for closing said gap, said trash shield comprising:
   a body portion comprising means for embracing the bottom, front and rear surfaces of said member;
   and a flap portion extending from said body portion upwardly and rearwardly in relation to the front surface of said member to close said gap between the occupant-accommodating seat portion and the member;
   said flap portion comprising upper terminal edge means for engagement with said bottom surface of the occupant-accommodating seat portion;
   said flap portion comprising resilient means rendering said flap portion resiliently deformable in response to the engagement of said upper terminal edge means by the bottom of said occupant-accommodating seat portion.

2. In a seat as recited in claim 1 wherein said trash shield comprises:
   a hook portion extending from said body portion upwardly and forwardly in relation to the rear surface of the member and comprising means for hooking over the top surface of said member.

3. In a seat as recited in claim 2 wherein said hook portion comprises:
   resilient means rendering the hook portion resiliently deformable between (1) a normal, undeformed disposition which said hook portion occupies when said member is unembraced by said body portion and (2) a resiliently deformed disposition which the hook portion occupies when the member is embraced by the body portion;
   said hook portion, when in its deformed disposition, extending further upwardly and rearwardly than it does when in said normal, undeformed disposition, thereby to increase the gripping action of the hook portion and body portion on said member.

4. In a seat as recited in claim 1 wherein:
   said resilient means of which the flap portion is comprised renders the flap portion resiliently deformable between (1) an undeformed first angular disposition in which the flap portion extends upwardly and rearwardly at a relatively steep angle, and (2) a deformed second angular disposition in which said flap portion extends at a shallower angle than in said undeformed disposition.

5. In a seat as recited in claim 4 wherein:
   said upper terminal edge means extends above the normal location of the bottom surface of the occupant-accommodating portion when the flap portion is in its undeformed disposition.

6. In a seat as recited in claim 1 wherein:
   said body portion of the trash shield has a U-shaped cross-section.

7. A horizontally elongated trash shield for closing the horizontally extending gap between (1) the bottom surface of an occupant-accommodating seat portion and (2) a seat frame member located below the front end of the former, said trash shield comprising:
   a body portion comprising means for embracing said member, said body portion having an upper front part;
   and a flap portion extending upwardly and rearwardly from said upper front part of said body portion;
   said flap portion comprising means for closing said horizontally extending gap;
   said flap portion comprising upper terminal edge means for engagement with said bottom surface of the occupant-accommodating seat portion when said body portion embraces said member;
   said flap portion comprising resilient means for rendering said flap portion resiliently deformable in response to the engagement of said upper terminal edge means by the bottom of said occupant-accommodating seat portion.

8. A trash shield as recited in claim 7 wherein:
said body portion has an upper rear part;
said trash shield comprising a hook portion extending upwardly and forwardly from said upper rear part of the body portion;
said hook portion comprising means for hooking over the top surface of said seat frame member.

9. In a seat as recited in claim 8 wherein said hook portion comprises:
resilient means rendering the hook portion resiliently deformable between (1) a normal, undeformed disposition which said hook portion occupies when said member is unembraced by said body portion and (2) a resiliently deformed disposition which the hook portion occupies when the member is embraced by the body portion;
said hook portion, when in its deformed disposition, extending further upwardly and rearwardly from the upper rear part of the body portion than it does when in said normal, undeformed disposition, thereby to increase the gripping action of the hook portion and body portion on said member.

10. A trash shield as recited in claim 7 wherein:
said resilient means of which the flap portion is comprised renders the flap portion deformable between (1) an undeformed, first angular disposition in which the flap portion extends at a relatively steep angle from the upper front part of said body portion and (2) a deformed, second angular disposition in which said flap portion extends at a shallower angle than in said undeformed disposition.

11. In a seat including an occupant-accommodating portion having a bottom surface and a seat frame including a horizontally disposed member having top and bottom surfaces and front and rear surfaces, said member being located below the front end of said occupant-accommodating portion to define a horizontally elongated gap between the latter and said member, the improvement comprising a horizontally elongated trash shield for closing said gap, said trash shield comprising:
a body portion comprising means for resiliently embracing the bottom, front and rear surfaces of said member;
and a resilient flap portion extending from said body portion upwardly and rearwardly in relation to the front surface of said member to close said gap between the occupant-accommodating seat portion and the member.

12. A horizontally elongated trash shield for closing the horizontally extending gap between (1) the bottom surface of an occupant-accommodating seat portion and (2) a seat frame member located below the front end of the former, said trash shield comprising:
a body portion comprising means for resiliently embracing said member, said body portion having an upper front part;
and a resilient flap portion extending upwardly and rearwardly from said upper front part of said body portion;
said resilient flap portion comprising means for closing said horizontally extending gap.

* * * * *